(12) United States Patent
Srivastava

(10) Patent No.: US 9,866,454 B2
(45) Date of Patent: Jan. 9, 2018

(54) GENERATING ANONYMOUS DATA FROM WEB DATA

(71) Applicant: Verizon Patent and Licensing Inc., Basking Ridge, NJ (US)

(72) Inventor: Ashok N. Srivastava, Mountain View, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 753 days.

(21) Appl. No.: 14/224,482

(22) Filed: Mar. 25, 2014

(65) Prior Publication Data

US 2015/0278157 A1    Oct. 1, 2015

(51) Int. Cl.
*H04L 12/26* (2006.01)
*H04L 29/08* (2006.01)

(52) U.S. Cl.
CPC .............. *H04L 43/04* (2013.01); *H04L 67/22* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,374,590 | B1 * | 2/2013 | Mikan | H04L 67/24 455/414.3 |
| 9,286,263 | B1 * | 3/2016 | Collins | H04L 67/36 |
| 2002/0087967 | A1 * | 7/2002 | Conkwright | G06Q 30/02 725/1 |
| 2002/0133490 | A1 * | 9/2002 | Conkwright | G06Q 30/02 |
| 2003/0065669 | A1 * | 4/2003 | Kahn | G06F 19/363 |
| 2008/0194268 | A1 * | 8/2008 | Koch | H04L 67/22 455/456.1 |
| 2008/0208868 | A1 * | 8/2008 | Hubbard | G06F 17/30867 |
| 2008/0227063 | A1 * | 9/2008 | Kenedy | G06Q 40/00 434/219 |
| 2008/0318678 | A1 * | 12/2008 | Stivoric | G06F 17/30598 463/36 |
| 2009/0012841 | A1 * | 1/2009 | Saft | G06Q 30/02 705/7.29 |

(Continued)

OTHER PUBLICATIONS

Pareschi et. al., Composition and Generalization of Context Data for Privacy Preservation, Sixth Annual IEEE International Conference on Pervasive Computing and Communications, 2008 IEEE, 429-433.*

(Continued)

*Primary Examiner* — Omar Fernandez Rivas
*Assistant Examiner* — Justin C Mikowski

(57) ABSTRACT

A device receives web data, associated with user devices, that is generated based on interactions of the user devices with a network and one or more content provider devices. The device removes erroneous or objectionable web data from the web data to generate a subset of the web data, and categorizes the subset of the web data by assigning categories to the subset of the web data. The device performs an empirical estimation of the categorized subset of the web data to generate empirical estimations. The device performs a simulation of the empirical estimations to generate synthetic data that corresponds to the web data and removes private information relating to the user devices and users of the user devices, and stores the synthetic data in a storage device.

20 Claims, 12 Drawing Sheets

(56) References Cited

U.S. PATENT DOCUMENTS

| | | | | |
|---|---|---|---|---|
| 2009/0247193 A1* | 10/2009 | Kalavade | ............... | H04L 67/18 455/456.3 |
| 2009/0254971 A1* | 10/2009 | Herz | ..................... | G06Q 10/10 726/1 |
| 2011/0082898 A1* | 4/2011 | Foster | .................... | H04L 67/22 709/202 |
| 2011/0213762 A1* | 9/2011 | Sherrets | ................ | G06Q 30/02 707/706 |
| 2011/0258049 A1* | 10/2011 | Ramer | ............. | G06F 17/30867 705/14.66 |
| 2013/0124628 A1* | 5/2013 | Weerasinghe | ..... | G06Q 30/0241 709/204 |
| 2013/0275889 A1* | 10/2013 | O'Brien-Strain | .. | G06Q 30/0269 715/760 |
| 2014/0032304 A1* | 1/2014 | Kent | ..................... | G06Q 30/02 705/14.43 |
| 2014/0337513 A1* | 11/2014 | Amalapurapu | ......... | H04L 67/00 709/224 |
| 2015/0154646 A1* | 6/2015 | Mishra | .................. | G06Q 50/24 705/3 |
| 2016/0267490 A1* | 9/2016 | Johnson | ............... | G06Q 30/018 |

OTHER PUBLICATIONS

Xie et. al., A Large-Scale Hidden Semi-Markov Model for Anomaly Detection on User Browsing Behaviors, IEEE/ACM Transactions on Networking, vol. 17, No. 1, Feb. 2009, 54-65.*

Minna Isomursu et. al., Experience Clip: Method for User Participation and Evaluation of Mobile Concepts, Proceedings Participatory Design Conference 2004, Toronto, Canada, 83-92.*

Timothy Sohn et. al., A Diary Study of Mobile Information Needs, CHI 2008 Proceedings, Data Collection, Apr. 5-10, 2008, Florence Italy, 433-442.*

* cited by examiner

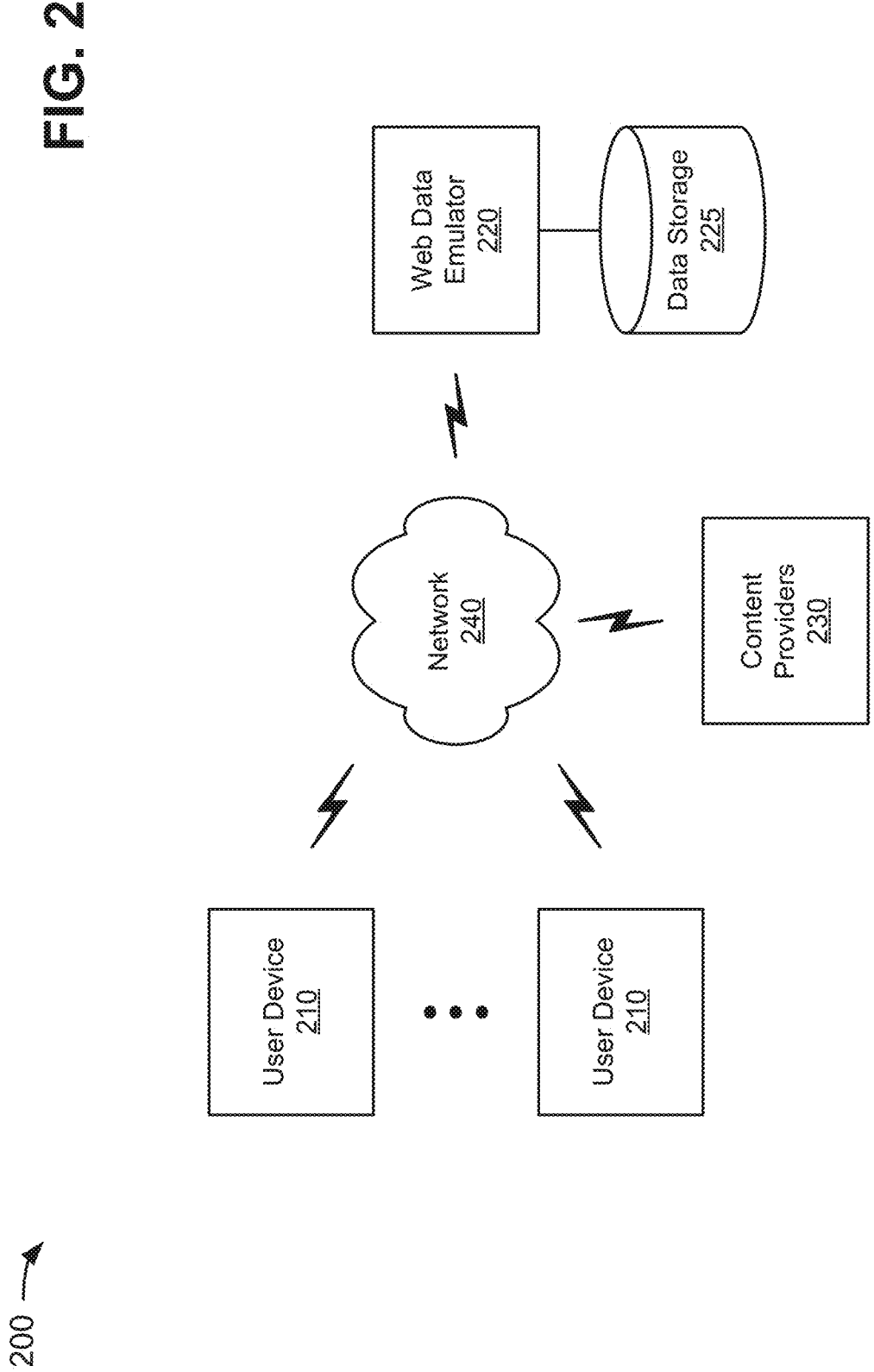

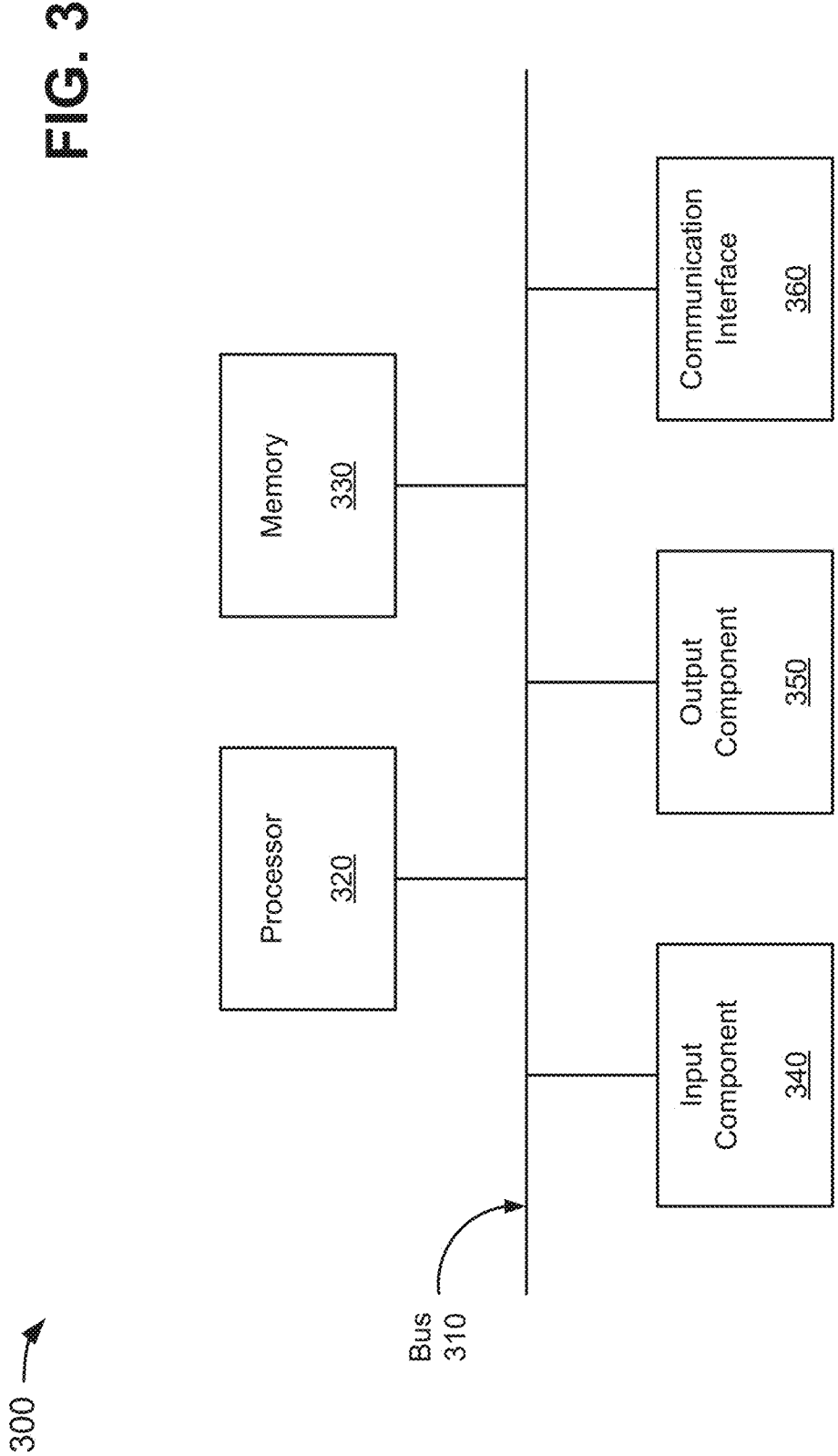

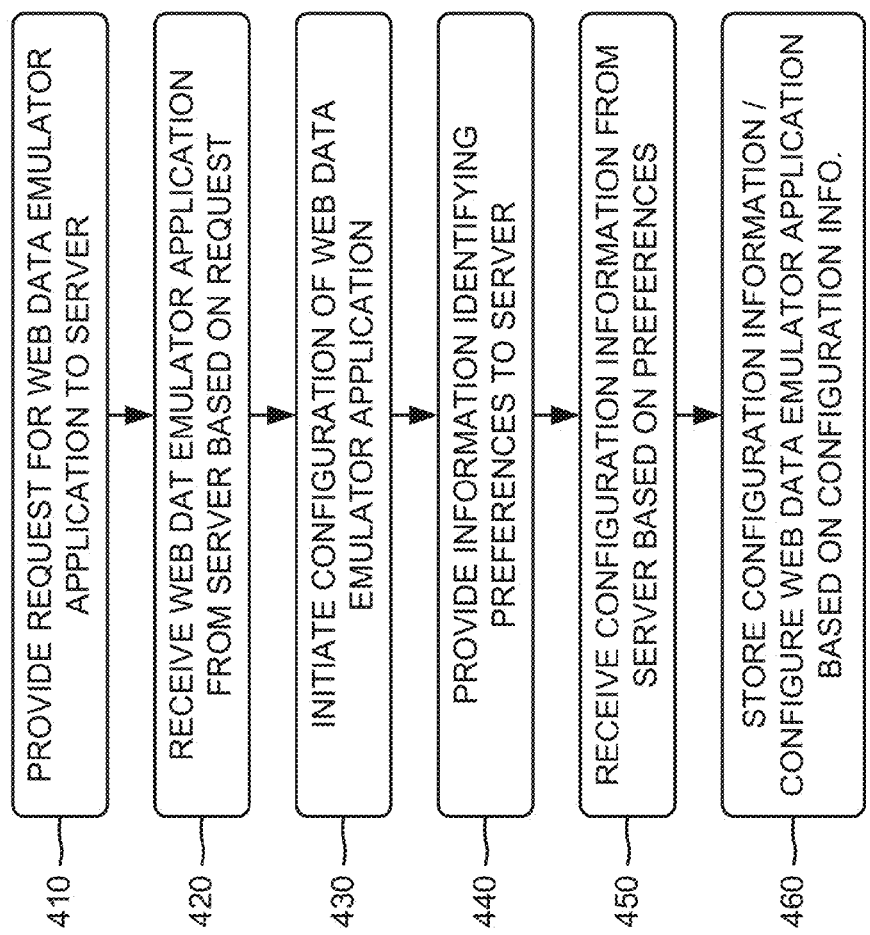

FIG. 5A

Web Data Emulator Application Configuration

Identify web data to import from user devices:

- Clickstream ○
- Location ○
- Time ○
- Network ○

Degree of anonymity (privacy) for web data

- Complete (99-100%) ○
- High (70-99%) ○
- Medium (40-70%) ○
- Low (0-40%) ○

[Back]  [More Configuration]  [Submit]

Web Data Emulator Application Configuration

Specify probability settings for web data

Tolerances for probability distributions  [ +/-10% ]

Length of probability chains  [ short ]

Time associated with online activities

Single web session  ○
Multiple web sessions in one day  ○
Multiple web sessions over days  ○
Multiple web sessions over weeks  ○

[ Back ]  [ More Configuration ]  [ Submit ]

510
540
550
500

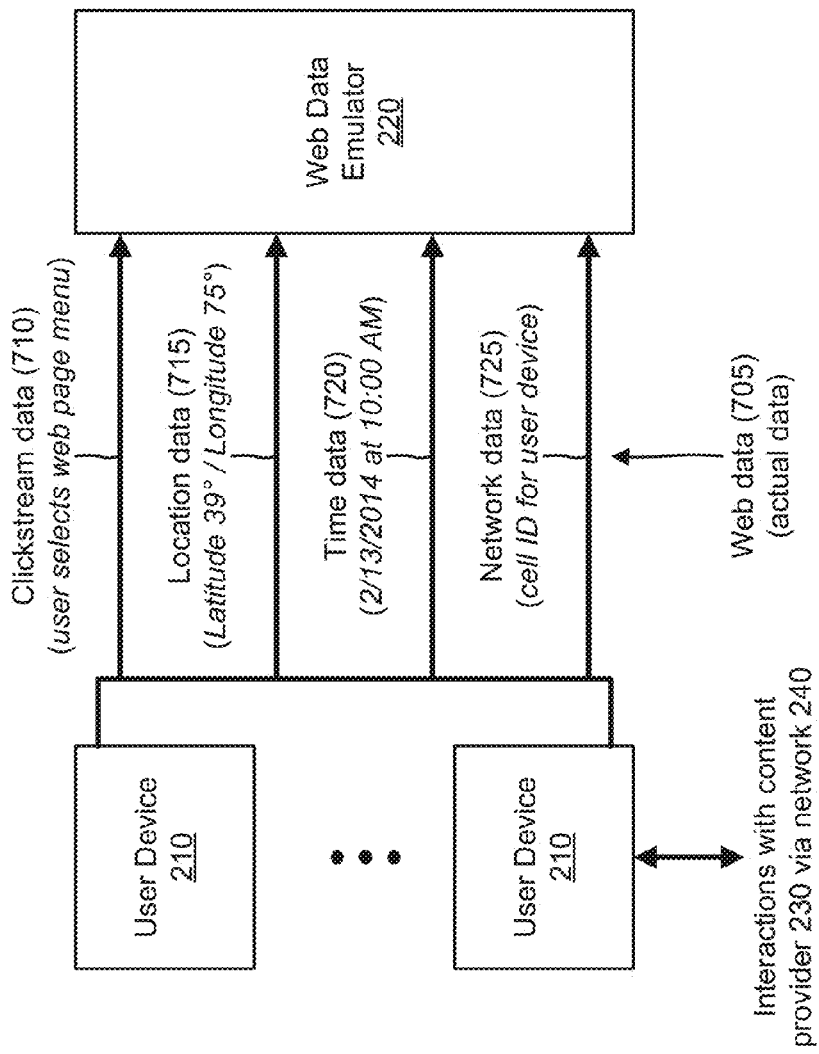

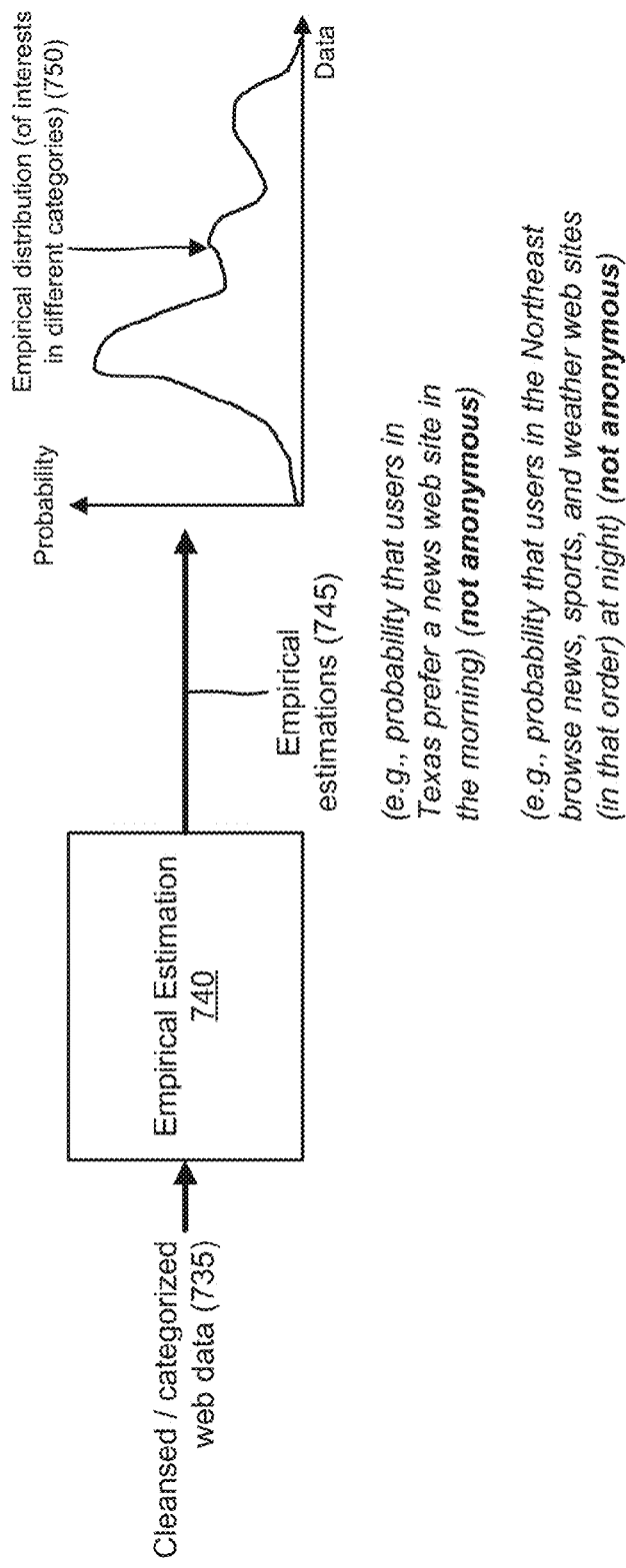

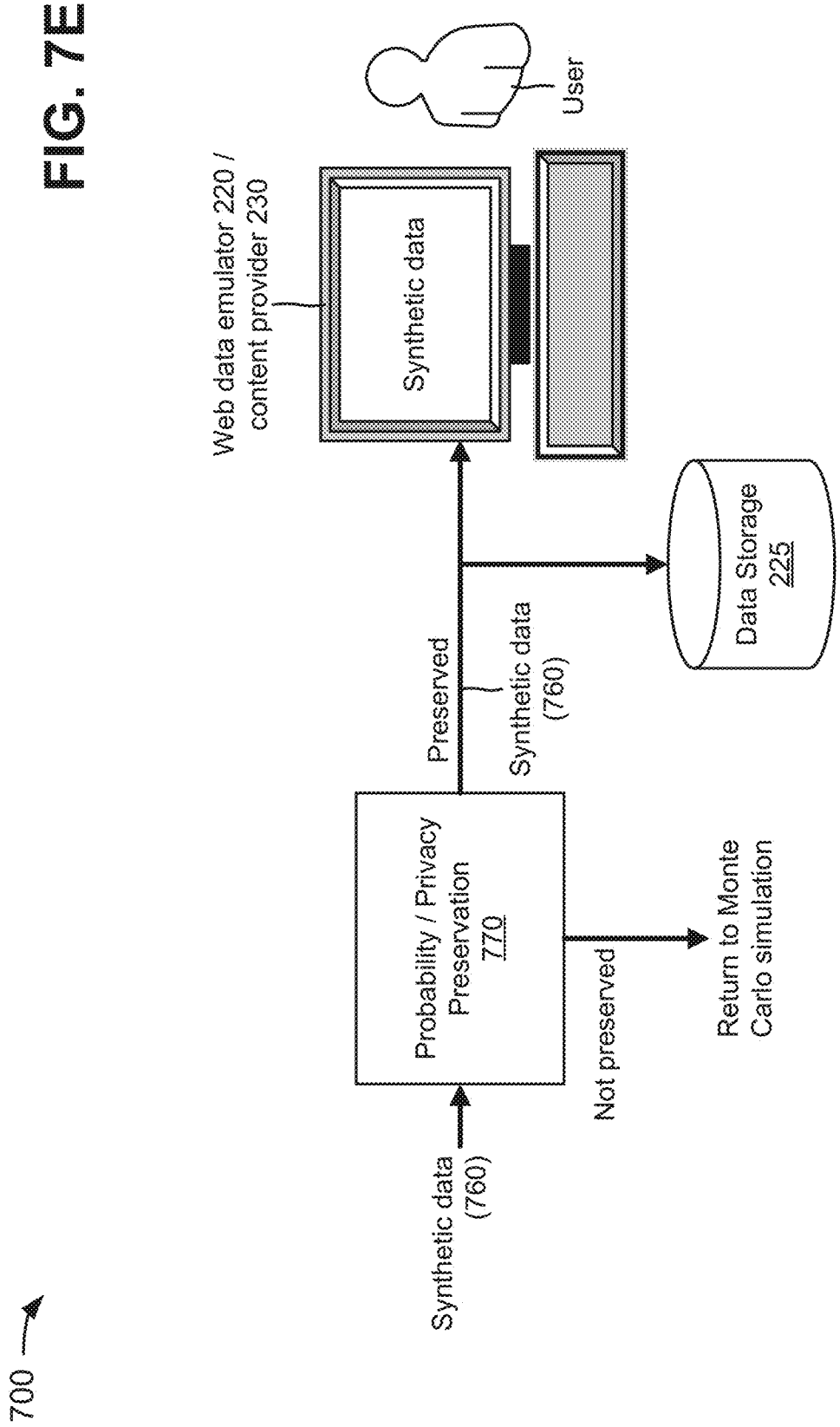

GENERATING ANONYMOUS DATA FROM WEB DATA

BACKGROUND

A user may utilize a user device (e.g., a smart phone, a laptop computer, a tablet computer, etc.) to access and view content, such as, for example, a web site, a video, an audio file, etc., provided by a content provider, via a network. Information associated with the user devices (e.g., locations of the user devices when the content is accessed, times associated with when the user devices access the content, network resources utilized by the user devices, etc.) and information associated with the content accessed by the user devices (e.g., clickstream data associated with the user devices) may be collected by a provider of the network.

BRIEF DESCRIPTION OF THE DRAWINGS

FIG. 2 is a diagram of an example environment in which systems and/or methods described herein may be implemented;

FIG. 3 is a diagram of example components of a device that may correspond to one or more of the devices of the environment depicted in FIG. 2;

FIG. 4 is a flow chart of an example process for receiving and configuring a web data emulator application;

FIGS. 5A and 5B are diagrams of an example user interface that may be used in connection with the example process shown in FIG. 4;

FIGS. 7A-7E are diagrams of an example relating to the example process shown in FIG. 6.

DETAILED DESCRIPTION OF PREFERRED EMBODIMENTS

The following detailed description refers to the accompanying drawings. The same reference numbers in different drawings may identify the same or similar elements.

Many users do not permit information associated with the user devices, and the content accessed by the user devices, to be shared with third parties. One reason that users do not share their information is the fear that the information may be used for improper purposes, such as credit card theft, identity theft, fraud purposes, etc. Content providers are constantly trying to find out as much about users as possible so that the content providers can market appropriate products, services, and/or content to the users. However, most content providers know very little about the users of their products, services, and/or content. Until users permit their information to be readily shared with the content providers, neither users nor the content providers will benefit from the user information.

Users' concern about privacy (e.g., tracking, unexplained observation and aggregation of data, etc.) is high and may adversely impact many content providers. A baseline of clear protections for users provides greater certainty for both users and content providers. As envisioned, user rights may include individual control, transparency, respect for context, security, access and accuracy, focused collection of data, and accountability. Users may have the right to exercise control over what user information network providers and/or content providers collect from the users and how the providers use the user information. Users may also have the right to expect that the user information wilt be collected, used, and disclosed in ways that are consistent with a context in which the users provide the user information.

Figure 1:
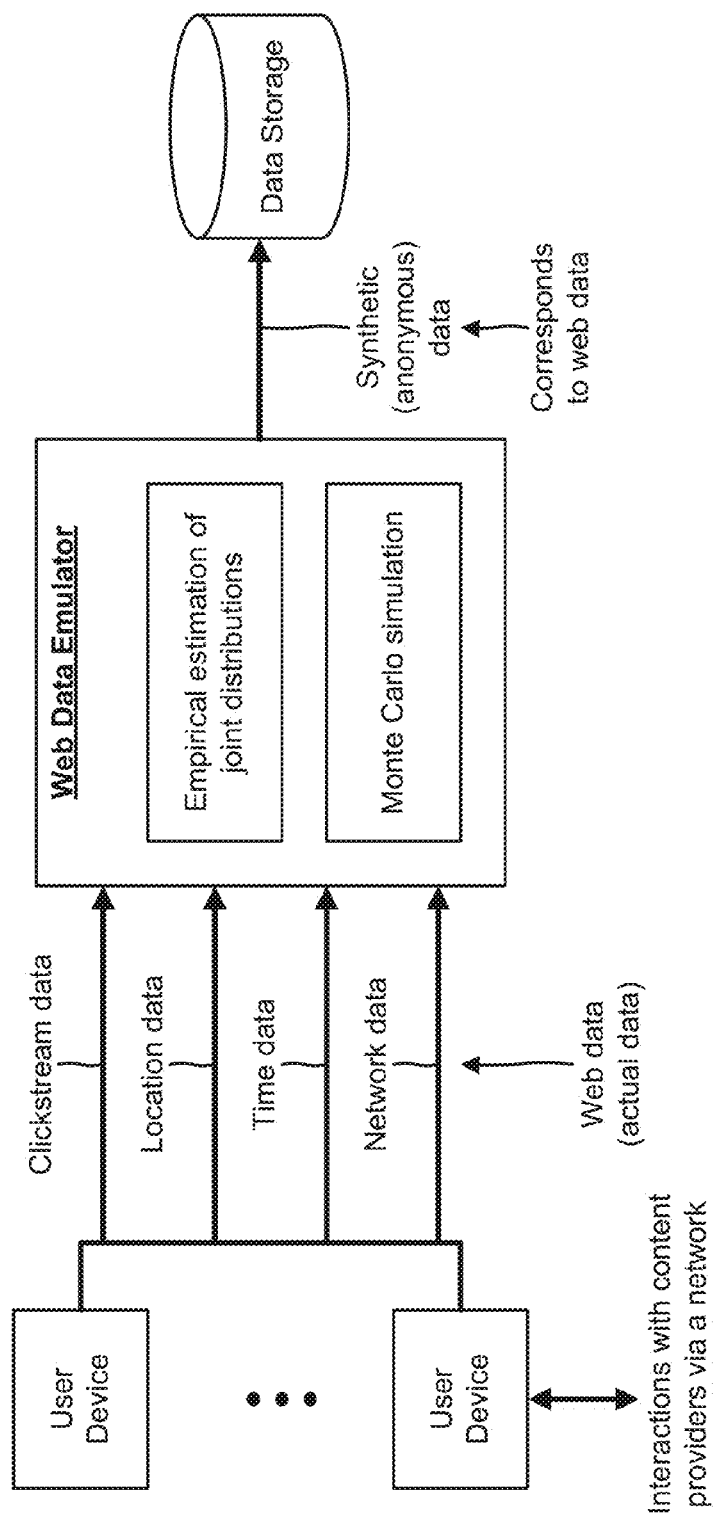
FIG. 1 is a diagram of an overview of an example implementation described herein.

FIG. 1 is a diagram of an overview of an example implementation 100 described herein. In example implementation 100, assume that multiple user devices are associated with a network and content providers (not shown). Further, assume that users of the user devices utilize the network to access and view content provided by the content providers. As shown in FIG. 1, the user devices interactions with the content providers via the network may cause user devices to generate web data. The web data may include actual data (e.g., data that includes information associated with the user devices, the content accessed by the user devices, the products and/or services purchased by the user devices, etc.), such as clickstream data, location data, time data, network data, etc.

The clickstream data may include information associated with portions of user interfaces that users select (e.g., or click on) while web browsing or using another software application. The clickstream data may be stored in the user devices and/or in a network resource (e.g., a server). The location data may include information associated with locations (e.g., global positioning system (GPS) coordinates, cellular triangulation locations, etc.) of the user devices when the content is accessed by the user devices. The location data may be stored in the user devices and/or in a network resource. The time data may include information associated with times when the user devices access the content (e.g., dates and times when the content is accessed, an amount of time the user devices are performing online activities, such as browsing, etc.). The time data may be stored in the user devices and/or in a network resource. The network data may include information associated with network resources (e.g. cells, base stations, servers, etc.) utilized by the user devices to access the content. The network data may be stored in the user devices and/or in a network resource.

As further shown in FIG. 1, the web data may be provided to a web data emulator that processes the web data in order to generate synthetic (or anonymous) data that corresponds (e.g., has similar statistical properties) to the web data. Synthetic data generally may include any data that is not obtained by direct measurement and that filters information that would otherwise compromise the confidentiality of particular aspects of the data. The web data emulator may perform an empirical estimation of joint distributions on the web data to produce empirical estimations (or probabilities). The web data emulator may perform a simulation of the empirical estimations to generate the synthetic data that corresponds to the web data. The web data emulator may determine whether the synthetic data preserves the anonymity of the web data and conforms to the empirical probabilities generated from the web data. If the web data emulator determines that the synthetic data preserves the anonymity and conforms to the empirical probabilities, the web data emulator may store the synthetic data in data storage and/or may output (e.g., for display) the synthetic data to a user of the web data emulator and/or to a particular device associated with the content providers.

Systems and/or methods described herein may enable content providers to learn about behaviors of users without divulging information about the users to the content providers. The systems and/or methods may enable the content providers to utilize the user behavior when determining appropriate products, services, and/or content to market to the users. The systems and/or methods may provide an analysis of large scale user behavior associated with content providers and networks (e.g., the Internet). The systems and/or methods may provide an understanding about particular user behavior associated with content providers and networks (e.g., that new parents typically shop for baby clothes, toys, etc. late at night since the parents may be awake tending to their babies).

FIG. 2 is a diagram of an example environment 200 in which systems and/or methods described herein may be implemented. As illustrated, environment 200 may include user devices 210, a web data emulator 220, data storage 225, content providers 230 (referred to collectively as "content providers 230" and individually as "content provider 230"), and a network 240. Devices/networks of environment 200 may interconnect via wired connections, wireless connections, or a combination of wired and wireless connections.

User device 210 may include a device that is capable of communicating with web data emulator 220 and content providers 230 over network 240. In some implementations, user device 210 may include a radiotelephone; a personal communications services (PCS) terminal that may combine, for example, a cellular radiotelephone with data processing and data communications capabilities; a smart phone; a personal digital assistant (PDA) that can include a radio-telephone, a pager, Internet/intranet access, etc.; a laptop computer; a tablet computer; or another type of computation and communication device.

Web data emulator 220 may include one or more personal computers, one or more workstation computers, one or more server devices, one or more virtual machines (VMs) provided in a cloud computing environment, or one or more other types of computation and communication devices. In some implementations, web data emulator 220 may be associated with an entity that manages and/or operates network 240, such as, for example, a telecommunication service provider, a television service provider, an Internet service provider, etc. In some implementations, web data emulator 220 may receive web data (e.g., clickstream data, location data, time data, network data, etc.) generated based on interactions of user devices 210 with content providers 230, via network 240. Web data emulator 220 may perform an empirical estimation of joint distributions on the web data to produce empirical estimations, and may perform a simulation of the empirical estimations to generate synthetic (or anonymous) data that corresponds to the web data. If web data emulator 220 determines the synthetic data preserves the anonymity of the web data and conforms to the empirical estimations generated from the web data, web data emulator 220 may store the synthetic data in data storage 225 and/or may output the synthetic data to a user of web data emulator 220 and/or to content providers 230.

Data storage 225 may include one or more storage devices that store information in one or more data structures, such as databases, tables, lists, trees, etc. In some implementations, data storage 225 may store information, such as the web data (e.g., clickstream data, location data, time data, network data, etc.) generated based on interactions of user devices 210 with content providers 230, via network 240; synthetic data generated by web data emulator 220 based on the web data; etc. In some implementations, data storage 250 may be included within web data emulator 220.

Content provider 230 may include one or more personal computers, one or more workstation computers, one or more server devices, one or more VMs provided in a cloud computing environment, or one or more other types of computation and communication devices. In some implementations, content provider 230 may provide content (e.g., a video stream, an audio stream, a file, a web page, a web site, software, information associated with a product, information associated with a service, an advertisement, etc.) to user devices 210, via network 240. In some implementations, content provider 230 may include a computer system, a cable head-end, a data warehouse, and/or a broadcasting device capable of providing video content (e.g., video on demand (VOD) content, high definition (HD)-VOD content, television programming, movies, on-demand services, live television, etc.) in a variety of formats; audio content in a variety of formats; commercials; advertisements; instructions; recommendations; promotions; web-based content (e.g., streaming content from web sites); and/or other information.

Network 240 may include a network, such as a local area network (LAN), a wide area network (WAN), a metropolitan area network (MAN), a telephone network, such as the Public Switched Telephone Network (PSTN) or a cellular network, an intranet, the Internet, a fiber optic network, a cloud computing network, or a combination of networks.

In some implementations, network 240 may include a fourth generation (4G) cellular network that includes an evolved packet system (EPS). The EPS may include a radio access network (e.g., referred to as a long term evolution (LTE) network), a wireless core network (e.g., referred to as an evolved packet core (EPC) network), an Internet protocol (IP) multimedia subsystem (IMS) network, and a packet data network (PDN). The LTE network may be referred to as an evolved universal terrestrial radio access network (E-UTRAN). The EPC network may include an all-IP packet-switched core network that supports high-speed wireless and wireline broadband access technologies. The EPC network may allow user devices 210 to access various services by connecting to the LTE network, an evolved high rate packet data (eHRPD) radio access network (RAN), and/or a wireless local area network (WLAN) RAN. The IMS network may include an architectural framework or network (e.g., a telecommunications network) for delivering IP multimedia services. The PDN may include a communications network that is based on packet switching.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

FIG. 3 is a diagram of example components of a device 300 that may correspond to one or more of the devices of environment 200. In some implementations, one or more of the devices of environment 200 may include one or more devices 300 or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions, and/or that is designed to implement a particular function. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, which enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

FIG. 4 is a flow chart of an example process 400 for receiving and configuring a web data emulator application. In some implementations, one or more process blocks of FIG. 4 may be performed by content provider 230. In some implementations, one or more process blocks of FIG. 4 may be performed by another device or a group of devices separate from or including content provider 230, such as user device 210 and/or web data emulator 220.

As shown in FIG. 4, process 400 may include providing a request for a web data emulator application to a server (block 410). For example, a user may cause content provider 230 to provide a request for a web data emulator application to web data emulator 220. In some implementations, the web data emulator application may include an application, a code snippet, a script, a widget, etc. that may cause web data emulator 220 to perform one or more functions. For example, the web data emulator application may enable the user to set preferences for generating synthetic data that has similar statistical properties to web data (e.g., clickstream data, location data, time data, network data, etc.) associated with user devices 210. In some implementations, the user may cause content provider 230 to access the web data emulator application via, for example, a user interface (such as a browser) provided by web data emulator 220, or in another manner. The user may then select, using content provider 230, information regarding the web data emulator application from the user interface to cause content provider 230 to provide a request for the web data emulator application to web data emulator 220. In some implementations, web data emulator 220 may offer the web data emulator application to content provider 230 without content provider 230 providing the request for the web data emulator application.

As further shown in FIG. 4, process 400 may include receiving the web data emulator application from the server based on the request (block 420). For example, content provider 230 may receive the web data emulator application from web data emulator 220, and may store the web data emulator application in a memory associated with content provider 230 (e.g., memory 330, FIG. 3). In some implementations, the user, of content provider 230, may establish an account associated with the web data emulator application prior to or after receiving the web data emulator application. In some implementations, the web data emulator application may be stored in web data emulator 220 (e.g., and not in content provider 230), and content provider 230 may access the web data emulator application via the user's account.

As further shown in FIG. 4, process 400 may include initiating a configuration of the web data emulator application (block 430). For example, the user may initiate the web data emulator application and identify, using content provider 230, one or more preferences relating to generating synthetic data that has similar statistical properties to web data associated with user devices 210. In some implementations, the user may identify the one or more preferences using one or more elements of a user interface provided by web data emulator 220 and/or content provider 230. The one or more elements may include, for example, one or more text input elements, one or more drop down menu elements, one or more checkbox elements, one or more radio button elements, and/or any other types of elements that may be used to receive information from the user.

Alternatively, or additionally, the one or more preferences may include a preference of the user with respect to the types of web data for the web data emulator application to import from user devices 210. For example, the web data emulator application may import clickstream data associated with user devices 210 during interactions with content provider 230, location data associated with user devices 210 during interactions with content provider 230, time data associated with user devices 210 during interactions with content provider 230, network data associated with user devices 210 during interactions with content provider 230, etc.

Alternatively, or additionally, the one or more preferences may include a preference of the user with respect to a degree of privacy (or anonymity) that the web data emulator application is to utilize for the web data, associated with user devices 210, when generating the synthetic data. For example, the web data emulator application may provide complete anonymity (e.g., 99-100% anonymity) for the web data when generating the synthetic data, high anonymity (e.g., 70-99% anonymity) for the web data when generating the synthetic data, medium anonymity (e.g., 40-70% anonymity) for the web data when generating the synthetic data, low anonymity (e.g., 0-40% anonymity) for the web data when generating the synthetic data, etc. In some implementations, other degrees of anonymity may be defined for the web data when generating the synthetic data. Alternatively, or additionally, the web data emulator application may enable users of user devices 210 to define the degree of anonymity for the web data when the web data emulator application generates the synthetic data.

Alternatively, or additionally, the one or more preferences may include a preference of the user with respect to probability settings utilized by the web data emulator application to generate the synthetic data based on the web data. For example, the user may specify tolerances for probability distributions utilized by the web data emulator application to generate the synthetic data based on the web data. In some implementations, the web data emulator application may utilize empirical estimation of joint distributions on the web data to generate empirical estimations e.g., probability distributions) for the web data. The user may spec tolerances (e.g., +/− a percentage, such +/−5%) for the probability distributions which may indicate that a value (e.g., "100") for the web data is within the specified tolerance (e.g., between "95" and "105"). In another example, the user may specify lengths (e.g., short, medium, or long) of probability (or Markov) chains utilized by the web data emulator application during the empirical estimation of joint distributions. In probability theory, the chain rule permits a calculation of any member of the joint distribution using only conditional probabilities.

Alternatively, or additionally, the one or more preferences may include a preference of the user with respect to time data associated with online activities (e.g., interactions with content provider 230) performed by user devices 210 and utilized by the web data emulator application to generate the synthetic data. For example, the user may indicate that the web data emulator application is to utilize time data associated with single web sessions conducted by user devices 210, multiple web sessions conducted by user devices 210 in a single day, multiple web sessions conducted by user devices 210 over multiple days, multiple web sessions conducted by user devices over multiple weeks, etc.

Alternatively, or additionally, a type of the account, of the user, associated with the web data emulator application may determine the quantity of preferences that the user is able to specify. For example, the web data emulator application may enable the user to specify only a portion of the above preferences or specify additional preferences based on the type of the account with which the user is associated.

As further shown in FIG. 4, process 400 may include providing information identifying one or more preferences to the server (block 440). For example, the user may cause content provider 230 to provide, to web data emulator 220, information identifying the one or more preferences relating to the user and provided during the configuration of the web data emulator application. In some implementations, a user of web data emulator 220 may provide the information identifying the one or more preferences relating to the user and provided during the configuration of the web data emulator application.

As further shown in FIG. 4, process 400 may include receiving configuration information from the server based on the preferences (block 450). For example, content provider 230 may receive, from web data emulator 220, configuration information that may be used to configure the web data emulator application to generate synthetic data that has similar statistical properties to web data associated with user devices 210.

In some implementations, web data emulator 220 may generate the configuration information, which may be used to configure the web data emulator application, based on the information identifying the one or more preferences of the user. For example, the configuration information may include information that causes the web data emulator application to generate synthetic data that has similar statistical properties to web data associated with user devices 210.

Alternatively, or additionally, the configuration information may include information that causes the web data emulator application to import different types of web data from user devices 210, such as clickstream data, location data, time data, network data, etc. Alternatively, or additionally, the configuration information may include information that causes the web data emulator application to utilize a particular degree of anonymity for the web data, associated with user devices 210, then generating the synthetic data.

Alternatively, or additionally, the configuration information may include information that causes the web data emulator application to utilize particular probability settings when generating the synthetic data based on the web data. Alternatively, or additionally, the configuration formation may include information that causes the web data emulator application to utilize particular time data, associated with online activities performed by user devices 210, when generating the synthetic data.

Alternatively, or additionally, the configuration information may be obtained from a data structure. In some implementations, web data emulator 220 may provide, to content provider 230, the configuration information independent of receiving the information identifying the one or more preferences of the user.

As further shown in FIG. 4, process 400 may include storing the configuration information and configuring the web data emulator application based on the configuration information (block 460). For example, the user may cause content provider 230 to store all or a portion of the configuration information received from web data emulator 220. The web data emulator application may be configured based on storing all or a portion of the configuration information. In some implementations, web data emulator 220 may store all or a portion of the configuration information.

In some implementations, web data emulator 220 may provide updates, to the configuration information, to content provider 230 based on use of the web data emulator application by the user and/or by other users of content providers 230. For example, web data emulator 220 may receive updates, to the configuration information, from one or more other users and may provide the received updates to content provider 230. Content provider 230 may store the updates to the configuration information. In some implementations, web data emulator 220 may provide the updates periodically based on a preference of the user and/or based on a time frequency determined by web data emulator 220. In some implementations, web data emulator 220 may de ermine whether to provide the updates based on the type of the account associated with the user.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A and 5B are diagrams 500 of an example user interface 510 that may be used in connection with example process 400 shown in FIG. 4. In some implementations, user interface 510 may be provided by web data emulator 220 to content provider 230 to enable a user to identify information (e.g., preferences) that may be used to configure the web data emulator application so that web data emulator 220 generates synthetic data that has similar statistical properties to web data associated with user devices 210. In some implementations, user interface 510 may be provided by web data emulator 220, to a user of web data emulator 220, to enable the user to identify information (e.g., preferences) that may be used to configure the web data emulator application.

Assume that the user has previously caused content provider 230 to request and download the web data emulator application or to log into an account associated with the web data emulator application. Further assume that the user causes content provider 230 to install the web data emulator application on content provider. When the user logs into the account or content provider 230 installs the web data emulator application, as shown in FIG. 5A, web data emulator 220 may provide user interface 510 to content provider 230 (or a user of web data emulator 220), and content provider 230 may display user interface 510 to the user. User interface 510 may allow the user to configure different features of the web data emulator application. For example, the user may identify preferences for the types of web data to import from user devices 210, for the web data emulator application, in a first configuration section 520. In some implementations, the user may indicate that the user wants the web data emulator application to import clickstream data from user devices 210. Alternatively, or additionally, the user may indicate that the user wants the web data emulator application to import location data from user devices 210. Alternatively, or additionally, the user may indicate that the user wants the web data emulator application to import time data from user devices 210. Alternatively, or additionally, the user may indicate that the user wants the web data emulator application to import network data from user devices 210.

As further shown in FIG. 5A, the user may identity preferences for a degree of anonymity that the web data emulator application is to utilize for the web data when generating the synthetic data, in a second configuration section 530. In some implementations, the user may indicate that the user wants the web data emulator application to utilize complete anonymity (e.g., 99-100% anonymity) for the web data when generating the synthetic data. In some implementations, the user may indicate that the user wants the web data emulator application to utilize high anonymity (e.g., 70-99% anonymity) for the web data when generating the synthetic data. In some implementations, the user may indicate that the user warrants the web data emulator application to utilize medium anonymity (e.g., 40-70% anonymity) for the web data when generating the synthetic data. In some implementations, the user may indicate that the user wants the web data emulator application to utilize low anonymity (e.g., 0-40% anonymity) for the web data when generating the synthetic data.

As shown in FIG. 5B, the user may identify preferences for probability settings that the web data emulator application is to utilize when generating the synthetic data based on the web data, in a third configuration section 540. In some implementations, the user may indicate that the user wants the web data emulator application to utilize particular tolerances for the probability distributions (e.g., +/−10%) when generating the synthetic data based on the web data. Alternatively, or additionally, the user may indicate that the user wants the web data emulator application to utilize particular lengths for probability chains (e.g., short) when generating the synthetic data based on the web data.

As further shown in FIG. 5B, the use may identify preferences for particular time data that the web data emulator application is to utilize when generating the synthetic data, in a fourth configuration section 550. In some implementations, the user may indicate that the user wants the web data emulator application to utilize a single web session, for the time data, when generating the synthetic data. In some implementations, the user may indicate that the user wants the web data emulator application to utilize multiple web sessions in a single day, for the time data, when generating the synthetic data. In some implementations, the user may indicate that the user wants the web data emulator application to utilize multiple web sessions over multiple days, for the time data, when generating the synthetic data. In some implementations, the user may indicate that the user wants the web data emulator application to utilize multiple web sessions over one or more weeks, for the time data, when generating the synthetic data.

Once the user has identified the preferences, user interface 510 may allow the user to select a "Submit" option to store the preferences and/or submit the preferences to content provider 230. Web data emulator 220 may then provide, to content provider 230, configuration information based on the preferences.

As further shown in FIGS. 5A and 5B, user interface 510 may also allow the user to select a "Back" option to cause web data emulator 220 to provide information regarding the web data emulator application. As also shown in FIGS. 5A and 5B, user interface 510 may also allow the user to select a "More Configuration" option to enable the user to identify additional information that may be used to configure the web data emulator application.

The number of elements of user interface 510 shown in FIGS. 5A and 5B is provided for explanatory purposes. In practice, user interface 510 may include additional elements, fewer elements, different elements, or differently arranged elements than those shown in FIGS. 5A and 5B.

Figure 6:
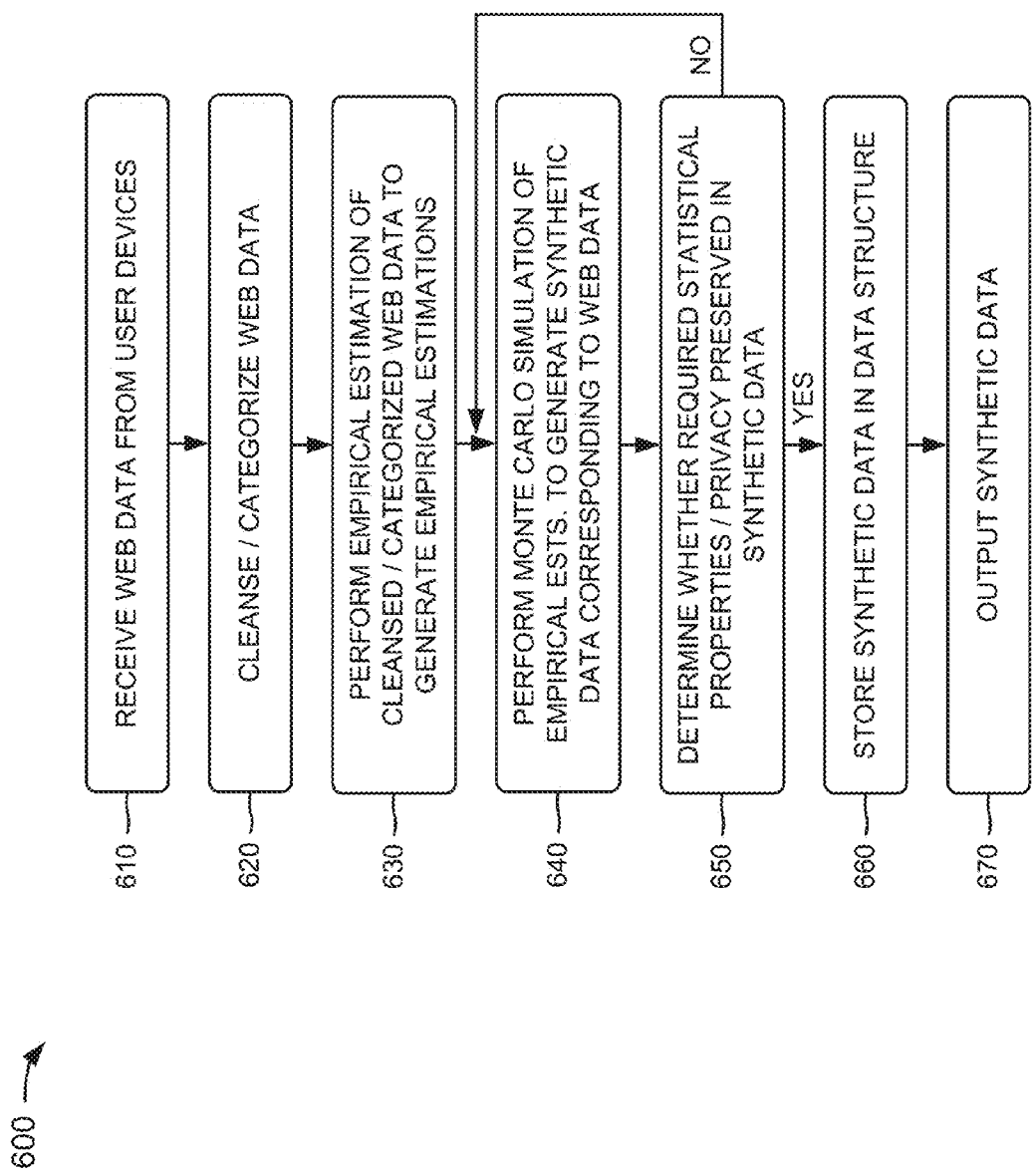
FIG. 6 is a flow chart of an example process for generating anonymous data from web data.

FIG. 6 is a flow chart of an example process 600 for generating anonymous data from web data. In some implementations, one or more process blocks of FIG. 6 may be performed by web data emulator 220. In some implementations, one or more process blocks of FIG. 6 may be performed by another device or a group of devices separate from or including web data emulator 220, such as content provider 230.

As shown in FIG. 6, process 600 may include receiving web dada from user devices (block 610). For example, user devices 210 may connect to network 240, and may generate web data based on interactions with content provider 230, via network 240. In some implementations, web data emulator 220 may monitor the web data associated with user devices 210, or user devices 210 may provide the web data to web data emulator 220. In some implementations, a device in network 240 may monitor the web data, and may route the web data to web data emulator 220. In some implementations, web data emulator 220 may receive and/or store the web data in memory (e.g., memory 330, FIG. 3) associated with web data emulator 220 and/or in data storage 225.

In some implementations, the web data may include actual data (e.g., data that includes information associated with user devices 210, content accessed by user devices 210, etc.), such as clickstream data, location data, time data, network data, etc. The clickstream data may include information associated with portions of user interfaces that users select (e.g., or click on) while web browsing or using another software application with user devices 210, an order in which users select web sites (e.g., a percentage of users may select a weather web site first and a sports web site second every day), etc. The location data may include information associated with locations (e.g., GPS coordinates, cellular triangulation locations street addresses, etc.) of user devices 210 when content is accessed by user devices 210 from content provider 230. The time data may include information associated with times when user devices 210 access content from content provider 230 (e.g., dates and times when the content is accessed, an amount of time user devices 210 are performing online activities, such as browsing, etc.). The network data may include information associated with resources of network 240 (e.g. cells, base stations, servers, etc.) utilized by user devices 210 to access content from content provider 230.

As further shown in FIG. 6, process 600 may include cleansing and/or categorizing the web data (block 620). For example, web data emulator 220 may cleanse and/or categorize the web data. In some implementations, web data emulator 220 may cleanse the web data by identifying and removing, from the web data (e.g., to create a subset of the web data): objectionable web sites (e.g., pornographic web sites, restricted web sites, investments accounts web sites, bank accounts web sites, etc.); web data that includes errors in the way the web data is recorded; corrupted web data; web data associated with software glitches; etc. from the web data. For example, if particular web data is associated with restricted physical locations government buildings, military bases, hospitals, etc.) from which monitoring web data may not be permitted, web data emulator 220 may remove the particular web data from the rest of the web data. In another example, if particular web data is associated with an event (e.g., a terrorist attack, a tornado, an election day, etc.) that occurs infrequently, web data emulator 220 may remove the particular web data from the rest of the web data.

In some implementations, web data emulator 220 may categorize the cleansed web data by assigning categories to the cleansed web data. In some implementations, web data emulator 220 may utilize web taxonomy techniques to assign numerous parallel categories to a same record in the web data (e.g., referred to as conceptual/contextual taxonomy or conceptual clustering). For example, web data emulator 220 may identify a particular web site (e.g., news.com) in the web data. Web data emulator 220 may determine that the particular web site is a news site based on the content of the particular web site, the uniform resource locator (URL) of the particular website, etc., and may assign the particular web site to a "news" category. In another example, web data emulator 220 may identify another particular web site (e.g., sports.com) in the web data. Web data emulator 220 may determine that the other particular web site is a sports web site based on the content of the other particular web site, the URL of the other particular web site, etc., and may assign the other particular web site to a "sports" category.

As further shown in FIG. 6, process 600 may include performing an empirical estimation of the cleansed and categorized web data to generate empirical estimations (block 630). For example, web data emulator 220 may perform an empirical estimation of the cleansed and categorized web data to generate empirical estimations. In some implementations, the empirical estimation may include an empirical estimation of joint probability distributions (e.g., referred to as empirical probability distributions). An empirical probability distribution may generally include a cumulative distribution associated with an empirical measure of a sample. The empirical probability distribution may include a step function that increases by 1/n at each of n data points. The empirical probability distribution may estimate an underlying cumulative distribution of data points in a sample, and may converge with a probability of one.

In some implementations, the empirical estimations generated by web data emulator 220 may include information that provides a representation of behaviors associated with users of user devices 210. For example, the empirical estimations may indicate that a particular number of the users access a news web site first, access a weather web site second, and access a sports web site last (e.g., in that order). In such an example, the order of accessing the web sites (e.g., news, weather, and sports) may be determined based on estimating a distribution of real data (e.g., empirical data), such as the web data. The estimated distribution may include a probability chain of user actions or interests, such as: (1) accessing a news web site, (2) accessing a weather web site; and (3) accessing a sports website. If the estimated distribution and the probability chain are determined, web data emulator 220 may be able to determine what a user will likely access next given that the user is at a certain position in the probability chain (e.g., if the user is accessing a weather web site, it is likely the user will access a sports web site next).

As further shown in FIG. 6, process 600 may include performing a Monte Carlo simulation of the empirical estimations to generate synthetic data corresponding to the web data (block 640). For example, web data emulator 220 may perform a simulation of the empirical estimations to generate synthetic data that corresponds to the web data. In some implementations, the synthetic data may include similar statistical properties as the web data (e.g., the empirical estimations). In some implementations, the synthetic data may include data that is not obtained by direct measurement (e.g., such as the web data), and may filter (e.g., make anonymous) information that would otherwise compromise the confidentiality of particular aspects of the web data. For example, the synthetic data may remove information that may identify user devices 210 and/or users of user devices 210 (e.g., mobile identification numbers (MINs), mobile directory numbers (MDNs). Internet protocol (IP) addresses, names, specific location information, specific time information, etc.).

For example, the synthetic data may define a synthetic user with the ability to randomly select from different news web sites. The behavior of the synthetic user may indicate that the user accesses a weather web site after the user accesses the selected news web site. The synthetic user may randomly select from different weather web sites. The behavior of the synthetic user may indicate that the user accesses a sports web site after the user accesses the selected weather web site. The synthetic user may randomly select from different sports web sites. In this example, the simulation may create a synthetic user that is randomly sampled from the web data and obeys the statistical property that users access a news web site first, a weather web site second, and a sports web site third. In some implementations, if the web data includes 100,000 web sites, accessed by the users, and if each web site corresponds to an interest of the users, the simulation may create synthetic data that includes some similarities to how users normally behave.

In some implementations, the simulation may include a Monte Carlo simulation that performs repeated random sampling of the empirical estimations to obtain numerical results, and executes the simulation many times in order to obtain a distribution of an unknown probabilistic entity (e.g., users of user devices 210). The Monte Carlo simulation may generally include defining a domain of possible inputs, generating inputs randomly from a probability distribution over the domain, performing a deterministic computation on the inputs, and aggregating the results. In some implementations, the Monte Carlo simulation may randomly sample the distributions (e.g., the empirical estimations) in such a way that the synthetic data obeys the statistical properties of the distributions. For example, if the empirical estimations indicate that 80% of the time users access news web sites and then weather web sites, then the synthetic data may indicate that 80% statistical property. If the synthetic data indicates that 2% or 100% of the time users access news web sites and then weather web sites, then the synthetic data may not correctly follow the 80% statistical property.

In some implementations, web data emulator 220 may utilize other stochastic simulation techniques when performing a simulation of the empirical estimations to generate synthetic data that corresponds to the web data. The other stochastic simulation techniques may include, for example, discrete-event simulations (e.g., Bernoulli distributions, binomial distributions, Poisson distributions, etc.); random number generation; continuous simulations (e.g., normal distributions, exponential distributions, student t-distribution, etc.); and/or one or more combinations of the aforementioned techniques.

As further shown in FIG. 6, process 600 may include determining whether required statistical properties and/or privacy are preserved in the synthetic data (block 650). For example, web data emulator 220 may determine whether the statistical properties associated with the empirical estimations and/or the privacy for anonymity) of the users and/or user devices 210 are preserved in the synthetic data. In some implementations, web data emulator 220 may determine whether the statistical properties associated with the empirical estimations are preserved in the synthetic data by determining a probability distribution for the synthetic data (e.g., in a manner similar to the way a probability distributions is determined for the web data). Web data emulator 220 may calculate a difference (e.g., a Kullback-Leibler distance or divergence) between the probability distribution for the synthetic data and the probability distribution for the web data. The Kullback-Leibler divergence may generally include a non-symmetric measure of a difference between two probability distributions. If the difference between the probability distribution for the synthetic data and the probability distribution for the web data does not exceed a particular threshold, web data emulator 220 may determine that the statistical properties associated with the empirical estimations are preserved in the synthetic data. If the difference between the probability distribution for the synthetic data and the probability distribution for the web data exceeds the particular threshold, web data emulator 220 may determine that the statistical properties associated with the empirical estimations are not preserved in the synthetic data.

In some implementations, web data emulator 220 may determine whether the privacy of the users and/or user devices 210 is preserved in the synthetic data by determining whether information associated with the users and/or user devices 210 (e.g., the clickstream data, the location data, the time data, the network data, etc.) is identified in the synthetic data. In some implementations, web data emulator 220 may determine whether information associated with the users and/or user devices 210 is identified in the synthetic data over a particular time period (e.g., in hours, days, weeks, months, etc.). In some implementations, if web data emulator 220 identifies information associated with the users and/or user devices 210 in the synthetic data, web data emulator 220 may de ermine that the privacy of the users and/or user devices 210 is not preserved in the synthetic data. In some implementations, if web data emulator 220 does not identify information associated with the users and/or user devices 210 in the synthetic data, web data emulator 220 may determine that the privacy of the users and/or user devices 210 is preserved in the synthetic data.

As further shown in FIG. 6, if the statistical properties and/or the privacy are not preserved in the synthetic data (block 650—NO), process 600 may include returning to process block 640. For example, if web data emulator 220 determines that the statistical properties associated with the empirical estimations and/or the privacy of the users and/or user devices 210 are not preserved in the synthetic data, web data emulator 220 may re-perform the simulation of the empirical estimations and regenerate the synthetic data. In some implementations, web data emulator 220 may suggest that one or more parameters of the simulation be adjusted (e.g., to correct the problems with the statistical properties and/or the privacy) before re-performing the simulation of the empirical estimations. In some implementations, web data emulator 220 may determine whether the statistical properties associated with the empirical estimations and/or the privacy of the users and/or user devices 210 are preserved in the regenerated synthetic data. In some implementations, if web data emulator 220 determines that the statistical properties associated with the empirical estimations and/or the privacy of the users and/or user devices 210 are not preserved in particular synthetic data, web data emulator 220 may discard the particular synthetic data.

As further shown in FIG. 6, if the statistical properties and the privacy are preserved in the synthetic data (block 650—YES), process 600 may include storing the synthetic data in a data structure (block 660). For example, if web data emulator 220 determines that the statistical properties associated with the empirical estimations and the privacy of the users and/or user devices 210 are preserved in the synthetic data, web data emulator 220 may store the synthetic data in memory (e.g., memory 330, FIG. 3) associated with web data emulator 220 and/or in data storage 225. In some implementations, the synthetic data may be stored in a data structure (e.g., a table, a list, a tree, a relational database, etc.) provided in the memory associated with web data emulator 220 and/or in data storage 225.

As further shown in FIG. 6, process 600 may include outputting the synthetic data (block 670). For example, if web data emulator 220 determines that the statistical properties associated with the empirical estimations and the privacy of the users and/or user devices 210 are preserved in the synthetic data, web data emulator 220 may output the synthetic data to a user of web data emulator 220 and/or to content provider 230. In some implementations, web data emulator 220 may provide, for display, the synthetic data to the user of web data emulator 220 and/or to a user of content provider 230. In some implementations, the synthetic data may enable the user of content provider 230 to learn about behaviors of users without divulging information about the users to the user of content provider 230. The synthetic data may enable content provider 230 to utilize the user behavior when determining appropriate products, services, acid/or content to market to the users.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7B:
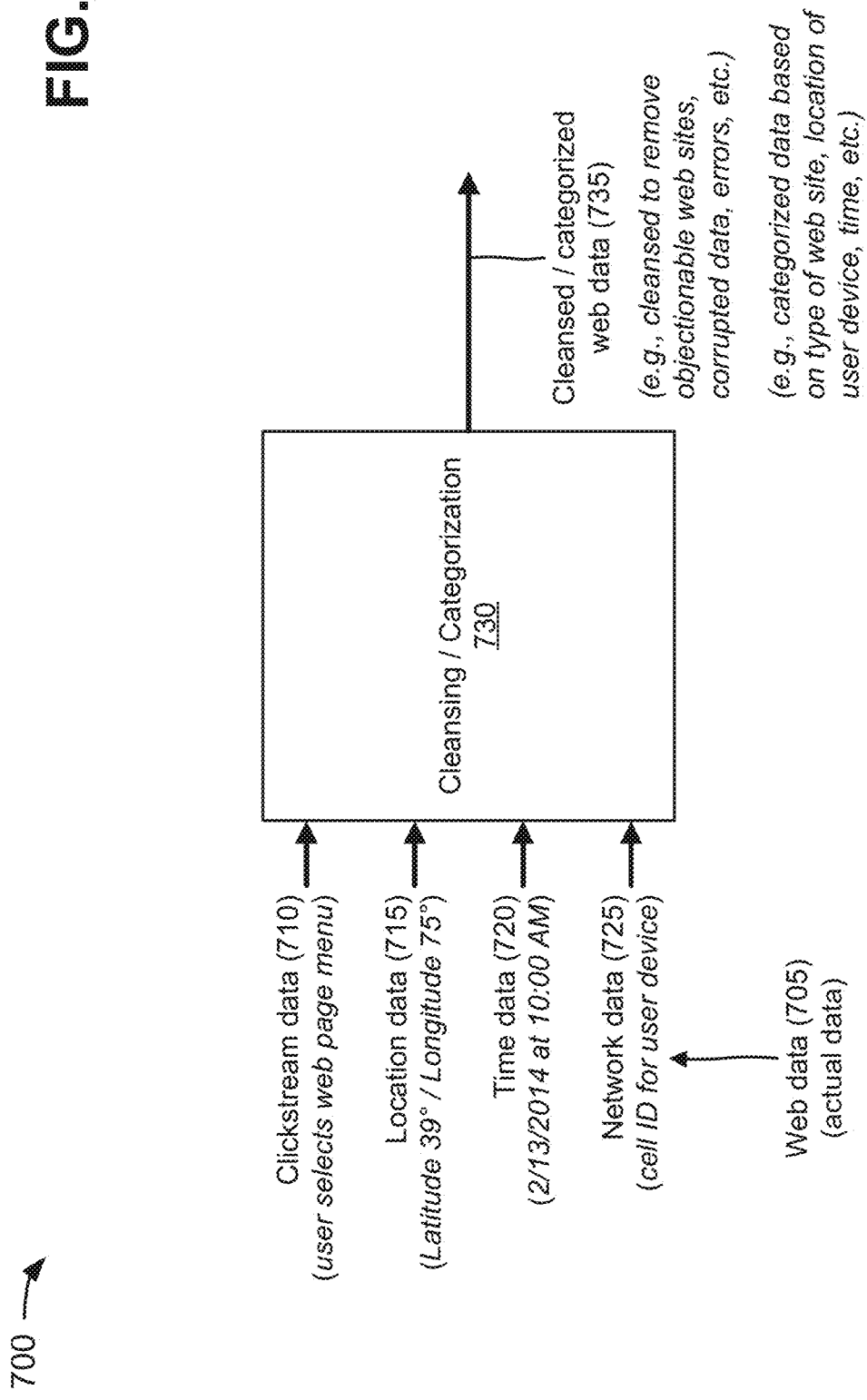

FIGS. 7A-7F are diagrams of an example 700 relating to example process 600 shown in FIG. 6. With reference to FIG. 7A, assume that users of user devices 210 cause user devices 210 to perform interactions, such as accessing and/or viewing one or more web sites, video files, audio files, software files, etc., with content provider 230, via network 240. The interactions with content provider 230 may cause user devices 210 to generate web data 705. Web data 705 may include actual data (e.g., data that includes information associated with user devices 210, the users of user devices 210, content accessed by user devices 210, etc.), such as clickstream data 710, location data 715, time data 720, network data 725, etc.

Clickstream data 710 may include information associated with portions of user interfaces that users select (e.g., or click on) while web browsing or using another software application. For example, as shown in FIG. 7A, clickstream data 710 may include information indicating that a user selects a web page menu. Location data 715 may include information associated with locations (e.g., GPS coordinates, cellular triangulation locations, street addresses, etc.) of user devices 210 when content is accessed by user devices 210. For example, as shown in FIG. 7A, location data 715 may include GPS coordinates (e.g., a latitude of 39° and a longitude of 75°) associated with a user device 210. Time data 720 may include info nation associated with times when user devices 210 access content (e.g., dates and times when content accessed, an amount of time user devices 210 are performing online activities, such as browsing, etc.). For example, as shown in FIG. 7A, time data 720 may include a date and a time (e.g., 2/13/2014 at 10:00 AM) associated with when a user device 210 accesses content. Network data 725 may include information associated with network resources (e.g. cells, base stations, servers, etc.) utilized by user devices 210 to access content. For example, as shown in FIG. 7A, network data 725 may include a cell identifier associated with one or more user devices 210. As further shown in FIG. 7A, web data 705 may be provided to web data emulator 220, and web data emulator 220 may receive web data 705.

As shown in FIG. 7B, web data emulator 220 may include a cleansing/categorization component 730 that receives web data 705, and cleanses and/or categorizes web data 705 to generate cleansed/categorized web data 735. Cleansing/ categorization component 730 may cleanse web data 705 by identifying and removing, from web data 705, objectionable web sites, web data 705 that includes errors, corrupted web data 705, web data 705 associated with software glitches (e.g., identified by content providers 230), etc. Cleansing/ categorization component 730 may categorize the cleansed web data 705 by assigning categories to the cleansed web data 705. For example, cleansing/categorization component 730 may categorize the cleansed web data 705 based on types of web site (e.g., sports web sites, news web sites, etc.), locations of user devices 210, time information associated with user devices 210, etc Cleansing/categorization component 730 may output cleansed/categorized web data 735 based on the cleansing and categorizing of web data 705.

As shown in FIG. 7C, web data emulator 220 may include an empirical estimation component 740 that receives cleansed/categorized web data 735, and performs an empirical estimation of joint distributions on cleansed/categorized web data 735. Empirical estimation component 740 may generate empirical estimations 745 (e.g., which are not anonymous) based on cleansed/categorized web data 735. For example, as shown in FIG. 7C, empirical estimations 745 may include a probability that non-anonymous users in Texas prefer a particular news web site in the morning. In another example, empirical estimations 745 may include a probability that non-anonymous users in the Northeast browse news, sports, and weather web sites (e.g., in that order) at night. As further shown in FIG. 7C, empirical estimations 745 may include a graph that provides an empirical distribution 750 (e.g., of users' interests in different categories, such as web sites, software, etc.).

Figure 7D:
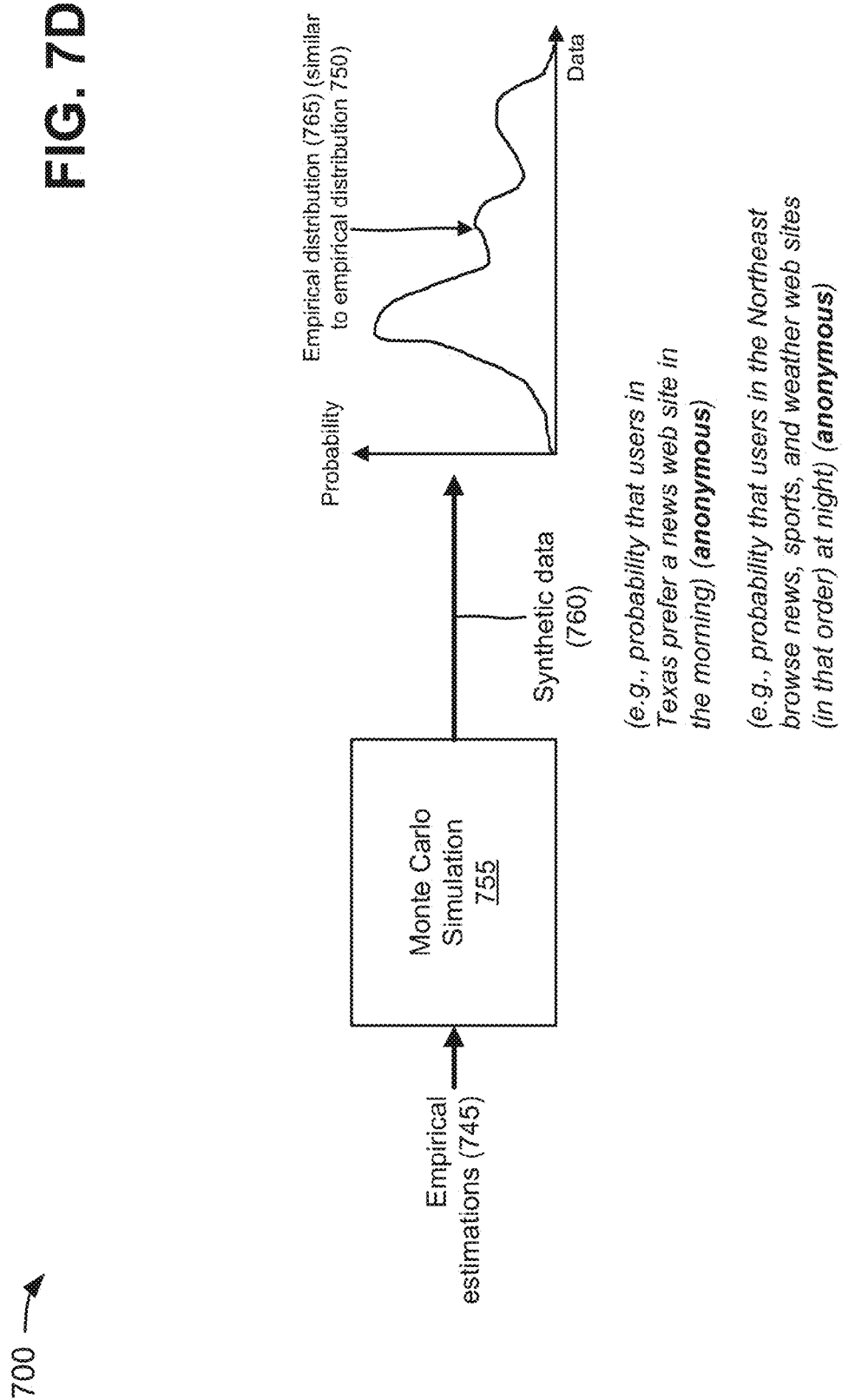

As shown in FIG. 7D, web data emulator 220 may include a Monte Carlo simulation component 755 that receives empirical estimations 745. Monte Carlo simulation component 755 may perform a Monte Carlo simulation of empirical estimations 745 to generate synthetic data 760 that corresponds to web data 705. Synthetic data 760 may include similar statistical properties as web data 705 and empirical estimations 745. Synthetic data 760 may filter (e.g., make anonymous) information that would otherwise compromise the confidentiality of particular aspects of web data 705. For example, as shown in FIG. 7D, synthetic data 760 may include a probability that anonymous users in Texas prefer a particular news web site in the morning. In another example, synthetic data 760 may include a probability that anonymous users in the Northeast browse news, sports, and weather web sites (e.g., in that order) at night. As further shown in FIG. 7D, synthetic data 760 may include a graph that provides an empirical distribution 765 (e.g., of anonymous users' interests in different categories) that is similar to empirical distribution 750 (FIG. 7C).

As shown in FIG. 7E, web data emulator 220 may include a probability/privacy preservation component 770 that receives synthetic data 760. Probability/privacy preservation component 770 may determine whether statistical properties associated with empirical estimations 745 and/or privacy of the users and/or user devices 210 are preserved in synthetic data 760. If probability/privacy preservation component 770 determines that the statistical properties of empirical estimations 745 and/or the privacy of the users and/or user devices 210 are not preserved in synthetic data 760, web data emulator 220 may utilize Monte Carlo simulation component 755 to re-perform the simulation of empirical estimations 745 and regenerate synthetic data 760. Web data emulator 220 may suggest that one or more parameters of the simulation be adjusted before re-performing the simulation of empirical estimations 745. Probability/privacy preservation component 770 may determine whether the statistical properties associated with empirical estimations 745 and/or the privacy of the users and/or user devices 210 are preserved in the regenerated synthetic data 760.

As further shown in FIG. 7E, if probability/privacy preservation component 770 determines that the statistical properties of empirical estimations 745 and the privacy of the users and/or user devices 210 are preserved in synthetic data 760, probability/privacy preservation component 770 may store synthetic data 760 in data storage 225 and/or may provide synthetic data 760, for display, to a user of web data emulator 220 and/or a user of content provider 230.

As indicated above, FIGS. 7A-7E are provided merely as an example. Other examples are possible and may differ from what was described with regard to FIGS. 7A-7E. In some implementations, the various operations described in connection with FIGS. 7A-7E may be performed automatically or at the request of a user.

Systems and/or methods described herein may enable content providers to learn about behaviors of users without divulging information about the users to the content providers. The systems and/or methods may enable the content providers to utilize the user behavior when determining appropriate products, services, and/or content to market to the users. The systems and/or methods may provide an analysis of large scale user behavior associated with content providers and networks. The systems and/or methods may provide an understanding about particular user behavior associated with content providers and networks.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

User interfaces may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user (e.g., via a touch screen display, a mouse, a keyboard, a keypad, voice commands, etc.). In some implementations, information provided by the user interfaces may include textual information and/or an audible form of the textual information.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method to provide synthetic data, when statistical properties and privacy information, associated with web data, are preserved in the synthetic data, comprising:

receiving, by a device and from user devices, the web data, the web data being associated with the user devices, the web data being generated based on interactions of the user devices with one or more content provider devices via a network, and the web data including one or more of:

clickstream data that includes information associated with portions of content, provided by the one or more content provider devices, that are selected via the user devices, location data that includes information associated with locations of the user devices when the content is accessed by the user devices, time data that includes information associated with times when the user devices access the content, or network data that includes information associated with network resources utilized by the user devices to access the content;

removing, by the device, erroneous or objectionable web data from the web data to generate a subset of the web data;

categorizing, by the device, the subset of the web data by assigning categories to the subset of the web data;

performing, by the device, an empirical estimation of the categorized subset of the web data to generate empirical estimations that include information that provides a representation of behaviors associated with users of the user devices;

receiving, by the device, a selection of an anonymity level associated with generating the synthetic data;

performing, by the device, a simulation of the empirical estimations to generate the synthetic data, the synthetic data including information associated with the empirical estimations, and the synthetic data removing private information, relating to the user devices and the users of the user devices, in accordance to the anonymity level;

determining, by the device, whether the statistical properties and the privacy information, associated with the web data, are preserved in the synthetic data; and selectively:
storing, by the device, the synthetic data in a storage device and providing the synthetic data when the statistical properties and the privacy information, associated with the web data, are preserved in the synthetic data, or re-performing, by the device, the simulation of the empirical estimations to generate other synthetic data when the statistical properties or the privacy information, associated with the web data, is not preserved in the synthetic data.

2. The method of claim 1, further comprising:
presenting, for display, the synthetic data to a device associated with at least one of the one or more content provider devices.

3. The method of claim 1, where the synthetic data includes the statistical properties, associated with the web data, without the private information from the web data.

4. The method of claim 1, where the simulation of the empirical estimations includes a Monte Carlo simulation of the empirical estimations.

5. The method of claim 1, where the empirical estimation of the categorized subset of the web data includes an empirical estimation of joint distributions of the categorized subset of the web data.

6. A device for providing synthetic data, when statistical properties and privacy information, associated with web data, are preserved in the synthetic data, comprising:
one or more processors to:
receive, from user devices, the web data,
the web data being generated based on interactions of the user devices with a plurality of content provider devices via a network, and
the web data including one or more of:
clickstream data that includes information associated with portions of content, provided by the plurality of content provider devices, that are selected via the user devices,
location data that includes information associated with locations of the user devices when the content is accessed by the user devices,
time data that includes information associated with times when the user devices access the content, or
network data that includes information associated with network resources utilized by the user devices to access the content;
remove erroneous or objectionable web data from the web data to generate a subset of the web data;
categorize the subset of the web data by assigning categories to the subset of the web data;
perform an empirical estimation of the categorized subset of the web data to generate empirical estimations that include information that provides a representation of behaviors associated with users of the user devices;
receive preference information for an anonymity level associated with generating synthetic data;
perform a simulation of the empirical estimations to generate the synthetic data,
the synthetic data including properties of the empirical estimations, and
the synthetic data removing private information, relating to the user devices and the users of the user devices, in accordance with the preference information;

determine whether the statistical properties and the privacy information, associated with the web data, are preserved in the synthetic data; and selectively:
store the synthetic data in a storage device, and provide the synthetic data when the statistical properties and the privacy information, associated with the web data, are preserved in the synthetic data, or
re-perform the simulation of the empirical estimations to generate other synthetic data when the statistical properties or the privacy information, associated with the web data, is not preserved in the synthetic data.

7. The device of claim 6, where, when providing the synthetic data, the one or more processors are to:
present, for display, the synthetic data to a user of the device or to a particular device associated with the plurality of content provider devices.

8. The device of claim 6, where the synthetic data includes statistical properties, associated with the web data, without the private information from the web data.

9. The device of claim 6, where the simulation of the empirical estimations includes a Monte Carlo simulation of the empirical estimations.

10. The device of claim 6, where the empirical estimation of the categorized subset of the web data includes an empirical estimation of joint distributions of the categorized subset of the web data.

11. A computer-readable medium for storing instructions, the instructions comprising:
one or more instructions that, when executed by one or more processors of a device for providing synthetic data, when statistical properties and privacy information, associated with web data, are preserved in the synthetic data, cause the one or more processors to:
receive, from user devices, the web data,
the web data being generated based on interactions of the user devices with one or more content provider devices via a network,
the web data including private information regarding at least one of the user devices or one or more users of the user devices, and
the web data including at least one of:
clickstream data that includes information associated with portions of content, provided by the one or more content provider devices, that are selected via the user devices,
location data that includes information associated with locations of the user devices when the content is accessed by the user devices,
time data that includes information associated with times when the user devices access the content, or
network data that includes information associated with network resources utilized by the user devices to access the content;
remove erroneous or objectionable web data from the web data to generate a subset of the web data;
categorize the subset of the web data by assigning categories to the subset of the web data;
perform an empirical estimation of the categorized subset of the web data to generate empirical estimations that include information that provides a representation of behaviors associated with the one or more users of the user devices;
receive a selection of an anonymity preference associated with generating synthetic data;
perform a simulation of the empirical estimations to generate the synthetic data, the synthetic data including information associated with the empirical estimations, and the synthetic data removing the private information from the web data in accordance with the anonymity preference;

determine whether the statistical properties and the privacy information, associated with the web data, are preserved in the synthetic data; and selectively store the synthetic data in a storage device and provide the synthetic data when the statistical properties and the privacy information, associated with the web data, are preserved in the synthetic data.

12. The computer-readable medium of claim 11, where the one or more instructions, when executed by the one or more processors, further cause the one or more processors to:

present, for display, the synthetic data to a user of the device or to a particular device associated with the one or more content provider devices.

13. The computer-readable medium of claim 11, where the one or more instructions, when executed by the one or more processors, further cause the one or more processors to:

selectively re-perform the simulation of the empirical estimations to generate other synthetic data when the statistical properties or the privacy information, associated with the web data, is not preserved in the synthetic data.

14. The computer-readable medium of claim 11, where the synthetic data includes the statistical properties, associated with the web data, without the private information from the web data.

15. The computer-readable medium of claim 11, where the simulation of the empirical estimations includes a Monte Carlo simulation of the empirical estimations.

16. The method of claim 1, where the empirical estimations include an indication that a particular number of users access particular websites in a particular order.

17. The device of claim 6, where the one or more processors are further to:

determine a probability that a particular user will access a particular website based on the empirical estimations.

18. The computer-readable medium of claim 11, where the private information includes at least one of:

a mobile identification number, a mobile directory number, an internet protocol address, a name, location information, or time information.

19. The method of claim 1, where categorizing the subset of the web data by assigning categories to the subset of the web data comprises:

utilizing web taxonomy techniques to assign parallel categories to a same record in the web data.

20. The device of claim 6, where the synthetic data defines a synthetic user.

* * * * *